US008934472B2

(12) United States Patent
Hwang et al.

(10) Patent No.: US 8,934,472 B2
(45) Date of Patent: Jan. 13, 2015

(54) UPLINK SYNCHRONIZATION METHOD BETWEEN TERMINAL AND BASE STATION

(75) Inventors: Hyun Gu Hwang, Daejeon (KR); Dae Ho Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 171 days.

(21) Appl. No.: 13/563,247

(22) Filed: Jul. 31, 2012

(65) Prior Publication Data

US 2013/0148645 A1   Jun. 13, 2013

(30) Foreign Application Priority Data

Dec. 7, 2011   (KR) .................. 10-2011-0130573

(51) Int. Cl.
   *H04J 3/06*   (2006.01)
   *H04L 7/00*   (2006.01)
(52) U.S. Cl.
   CPC .... *H04J 3/06* (2013.01); *H04L 7/00* (2013.01)
   USPC .......................................... 370/350; 370/503
(58) Field of Classification Search
   CPC ............. H04L 7/00; H04L 7/004; H04L 7/10; H04J 3/06
   USPC ................................................. 370/350, 503
   See application file for complete search history.

(56) References Cited

U.S. PATENT DOCUMENTS

| 5,745,535 | A  | * | 4/1998 | Mori .............................. 375/355 |
| 7,873,024 | B1 | * | 1/2011 | Fenwick et al. .............. 370/350 |
| 2008/0144726 | A1 | * | 6/2008 | Ingber et al. ............. 375/240.28 |
| 2008/0214193 | A1 | * | 9/2008 | Jeong et al. .................... 455/436 |
| 2010/0111028 | A1 | * | 5/2010 | Kim et al. ..................... 370/329 |
| 2011/0064069 | A1 | * | 3/2011 | Lipka ............................ 370/344 |
| 2011/0085611 | A1 | * | 4/2011 | Laroia et al. .................. 375/260 |
| 2012/0044897 | A1 | * | 2/2012 | Wager et al. .................. 370/329 |

FOREIGN PATENT DOCUMENTS

| KR | 1020090116590 | 11/2009 |
| KR | 1020100026390 | 3/2010 |
| KR | 1020100048946 | 5/2010 |

* cited by examiner

*Primary Examiner* — Farah Faroul
(74) *Attorney, Agent, or Firm* — Nelson Mullins Riley & Scarborough LLP; Anthony A. Laurentano, Esq.; Lewis Lee, Esq.

(57) ABSTRACT

Disclosed is an uplink synchronization method of a base station according to the present invention includes receiving an initial access signal from a terminal; obtaining an uplink synchronization using the received initial access signal; informing the terminal about obtainment of the uplink synchronization; and receiving a data signal from the terminal. According to the present invention, a marine wireless communication system may efficiently perform uplink synchronization between the base station and the terminal, and may efficiently operate wireless resources.

14 Claims, 3 Drawing Sheets

INITIAL ACCESS FRAME

DATA FRAME

FIRST TIME WINDOW

SECOND TIME WINDOW

UPLINK SYNCHRONIZATION METHOD BETWEEN TERMINAL AND BASE STATION

CROSS-REFERENCE TO RELATED APPLICATIONS

This application claims priority to and the benefit of Korean Patent Application No. 10-2011-0130573 filed in the Korean Intellectual Property Office on Dec. 7, 2011, the entire contents of which are incorporated herein by reference.

TECHNICAL FIELD

The present invention relates to an uplink synchronization method between a terminal and a base station, and more particularly, to an uplink synchronization method between a base station and a terminal for a marine wireless communication system.

BACKGROUND ART

In a wireless communication system, a transmission direction from a base station to a mobile station (terminal) is defined as a downlink and a transmission direction from the terminal to the base station is defined as an uplink.

In general, in the wireless communication system, the base station calculates a round trip time (RTT) from an initial access signal that is transmitted from the terminal. When the base station informs the terminal about the calculated RTT, the terminal transmits a signal as early as the RTT whereby the base station and the terminal maintain uplink synchronization. The above method is used in a portable telephone system or a wireless local area network (WLAN) system.

However, the above method is not suitable for a marine wireless communication system. In the case of land wireless communication, generally, the terminal periodically transmits information and a propagation delay time is also very short as compared to marine wireless communication. At sea, the propagation delay time is very long and communication does not occur as frequently as on land. Through marine wireless communication, e-mail or information such as a marine map, weather data, travel route data of a ship and the like are transmitted and received. When providing the above communication service, there is no need to continuously maintain uplink synchronization. Only, there is a need to provide an appropriate service opportunely in response to a service request that occurs from time to time.

Further, in the marine wireless communication, it is difficult to use a wide bandwidth as used in the land wireless communication. Accordingly, it is necessary to efficiently use an allocated bandwidth and a further simpler communication scheme is required.

SUMMARY OF THE INVENTION

The present invention has been made in an effort to provide an uplink synchronization method for efficiently performing uplink synchronization between a base station and a terminal in a marine wireless communication system and efficiently operating wireless resources.

An exemplary embodiment of the present invention provides an uplink synchronization method of a base station, including: receiving an initial access signal from a terminal; obtaining an uplink synchronization using the received initial access signal; informing the terminal about obtainment of the uplink synchronization; and receiving a data signal from the terminal.

An initial access frame corresponding to the initial access signal may include a first synchronization symbol, and the obtaining of the uplink synchronization may obtain the uplink synchronization using the first synchronization symbol.

A data frame corresponding to the data signal may include a second synchronization symbol, and the uplink synchronization method may further include tracing the uplink synchronization using the second synchronization symbol based on the obtained uplink synchronization. Here, a length of the first synchronization symbol may be greater than a length of the second synchronization symbol.

An initial access frame corresponding to the initial access signal may include a first synchronization symbol, and the obtaining of the uplink synchronization may obtain the uplink synchronization using correlation about the first synchronization symbol in a first time window.

A data frame corresponding to the data signal may include a second synchronization symbol, and the uplink synchronization method may further include tracing, by the base station based on the obtained uplink synchronization, the uplink synchronization using correlation about the second synchronization symbol in a second time window. Here, the first time window may be greater than the second time window.

The uplink synchronization method may further include matching and thereby storing, by the base station, time information of the obtained uplink synchronization and identification information of the terminal.

Another exemplary embodiment of the present invention provides an uplink synchronization method, including: transmitting, by a terminal, an initial access signal to a base station; obtaining, by the base station, an uplink synchronization using the initial access signal received from the terminal; informing, by the base station, the terminal about obtainment of the uplink synchronization; transmitting, by the terminal, a data signal to the base station; and receiving, by the base station, the data signal from the terminal.

According to exemplary embodiments of the present invention, it is possible to efficiently perform uplink synchronization between a base station and a terminal in a marine wireless communication system and to efficiently operate wireless resources.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
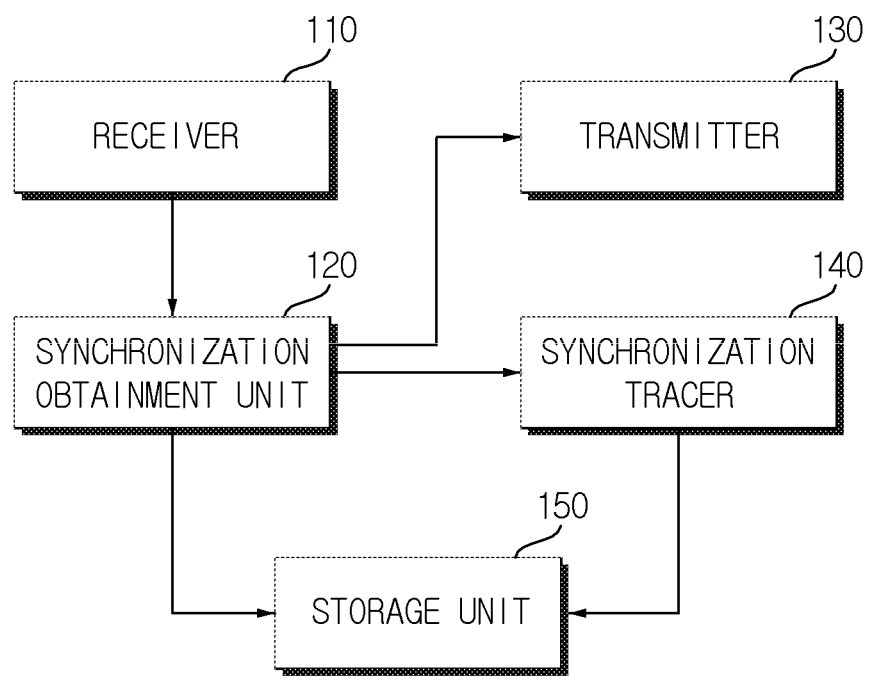
FIG. 1 is a block diagram of a base station apparatus that performs uplink synchronization according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

As described above, a bandwidth allocated to a marine wireless communication system is narrow compared to a land wireless communication system and thus, needs to be efficiently used. In the case of marine wireless communication, attention should be paid on an aspect that a round trip time (RTT) is very long compared to land wireless communication. That the RTT is very long indicates that synchronization needs to be detected in a significantly long time window in order to obtain initial synchronization of uplink. Accordingly, a long synchronization symbol is used in an exemplary embodiment of the present invention in order to improve the initial synchronization detection performance. When an uplink frame has a long synchronization symbol, the uplink frame has a relatively small amount of data and thus, the long synchronization symbol may degrade the communication efficiency.

To overcome the above issue, two uplink signals are defined in the exemplary embodiment of the present invention. One is an initial access signal for initial synchronization detection and another is a data signal for actual data transmission. The initial access signal has a sufficiently long synchronization symbol, but the data signal has a synchronization symbol shorter than the initial access signal. A base station that receives the initial access signal may obtain uplink synchronization using the long synchronization symbol. The data signal also has a synchronization symbol. Here, the base station is already aware of the obtained uplink synchronization and thus, may trace the uplink synchronization based on the obtained uplink synchronization. Accordingly, the synchronization symbol included in the data signal may have a minimum length enough to be capable of tracing synchronization based on the obtained uplink synchronization.

According to an exemplary embodiment of the present invention, a base station may apply, to receiving of a subsequent data signal, uplink synchronization obtained through an initial access signal. According to an exemplary embodiment of the present invention, there is no need for a base station to inform a terminal about an RTT, and for the terminal to transmit a signal in advance by the RTT, which is different from a general land wireless communication system. The base station stores uplink synchronization information obtained through the initial access signal. When a data signal is received, the base station may trace the uplink synchronization or may demodulate received data using the uplink synchronization information. An RTT is very long at sea and thus, there are some constraints on compensating for the RTT in the terminal. When compensating for the RTT, it may affect other base stations. A service at sea does not occur as frequently as on land. Accordingly, it is efficient to obtain uplink synchronization when a service request is received, to provide a corresponding service, and to terminate communication.

Figure 2:
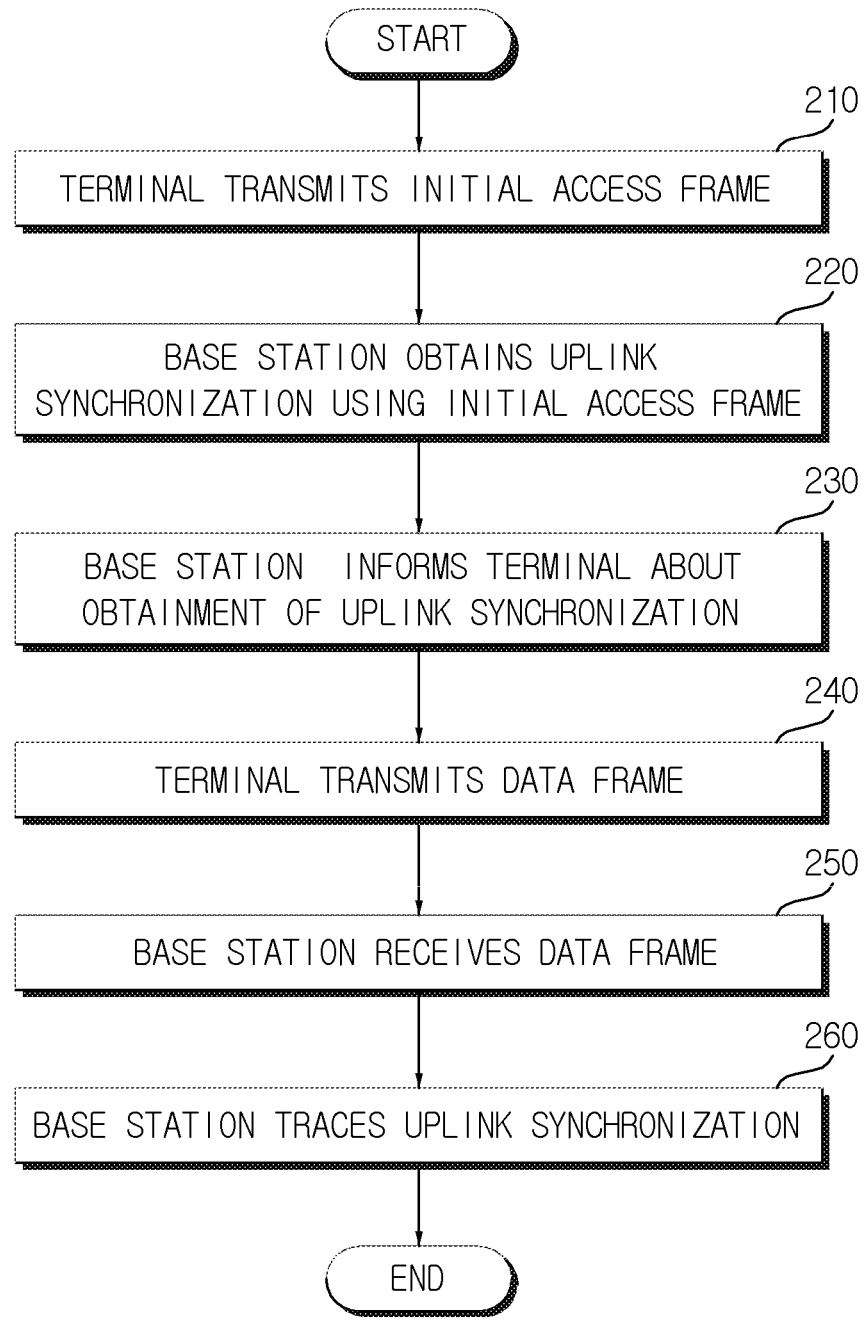
FIG. 2 is a flowchart of an uplink synchronization method according to an exemplary embodiment of the present invention.

FIG. 1 is a block diagram of a base station apparatus that performs uplink synchronization according to an exemplary embodiment of the present invention, and FIG. 2 is a flowchart of an uplink synchronization method according to an exemplary embodiment of the present invention. The base station apparatus is provided in a base station and may be a partial configuration of the base station. Hereinafter, description will be made with reference to FIGS. 1 and 2.

Referring to FIG. 1, the base station apparatus includes a receiver 110 to receive an initial access signal from a terminal and to also receive a data signal from the terminal, a synchronization obtainment unit 120 to obtain uplink synchronization using the received initial access signal, a transmitter 130 to inform the terminal about obtainment of the uplink synchronization, a synchronization tracer 140 to trace the uplink synchronization based on the obtained uplink synchronization, and a storage unit 150 to store uplink synchronization information and identification information of the terminal.

Referring to FIG. 2, initially, a terminal (not shown) transmits an initial access frame corresponding to an initial access signal to a base station for uplink synchronization (operation 210). The terminal may also transmit the initial access frame in response to a service request of the base station, and may also transmit the initial access frame when a request for a predetermined service occurs in the terminal. In any case, to perform a corresponding service every time a service request occurs, the terminal transmits the initial access frame as the first frame when communicating with the base station. Next, the receiver 110 receives the initial access frame, and the synchronization obtainment unit 120 obtains the uplink synchronization using the initial access frame (operation 220).

Figure 3A:
FIGS. 3A and 3B illustrate an example of a frame structure of an initial access frame and a data frame.

FIG. 3A shows an example of a frame structure of an initial access frame. Referring to FIG. 3A, the initial access frame includes a guard interval, a data symbol, and a synchronization symbol. The data symbol of the initial access frame may include data that a terminal is to transmit to a base station, or may include a null value. A portion of the data symbol may include identification information of the terminal. The synchronization symbol of the initial access frame is longer than a synchronization symbol included in a data frame of FIG. 3B, which will be described later, and has a sufficiently long length with which the base station may obtain initial synchronization. The synchronization symbol may include a training sequence, a pilot sequence, and the like. The synchronization symbol may include a sequence having an excellent autocorrelation characteristic. As the autocorrelation characteristic is further enhanced, the synchronization detection may be further easily performed. The synchronization detection performance is improved as a length of the synchronization symbol increases. A length of the synchronization symbol may be defined based on required performance of a wireless communication system, for example, a marine wireless communication system.

In operation 220, the synchronization obtainment unit 120 obtains uplink synchronization using the synchronization symbol included in the initial access frame. Specifically, the synchronization obtainment unit 120 performs correlation between a predefined code and the received synchronization symbol in a time window having a predetermined size, and obtains time information of the uplink synchronization using a correlation value. The obtained time information corresponds to an RTT of the corresponding terminal.

Figure 4A:
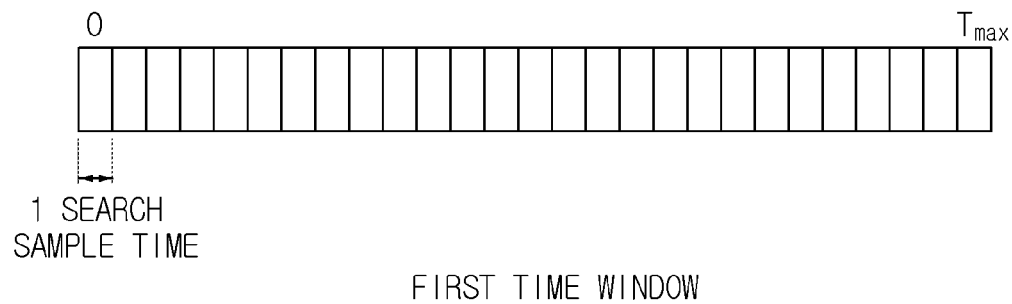
FIGS. 4A and 4B illustrate an example of a time window for obtaining initial synchronization and a time window for tracing synchronization.

FIG. 4A shows a time window for obtaining the initial synchronization. In a base station, the maximum possible RTT is defined. When the maximum possible RTT is defined as $T_{max}$, the synchronization obtainment unit 120 performs the correlation in a time window from a reference time to $T_{max}$. Here, 1 search sample time may be set appropriately based on the required performance or necessity. For example, the 1 search sample time may be set as 1 modulation symbol time. When a single modulation symbol oversampled, it may be set as 1 oversampling time. A time corresponding to the largest value among correlation values calculated in the time window is used as an RTT of a corresponding terminal.

Meanwhile, identification information of the terminal is included in the initial access frame that is transmitted from the terminal in operation 210. The identification information of the terminal may be included in the data symbol. The synchronization obtainment unit 120 may match time information of the uplink synchronization obtained in operation 220 and identification information of the corresponding terminal, and thereby may store the matched information in the storage unit 150.

Referring again to FIG. 2, when the uplink synchronization is obtained, the transmitter 130 informs the terminal that the uplink synchronization is obtained (operation 230). As described above, here, there is no need for the base station to inform the terminal about the above calculated RTT. While informing the terminal about obtainment of the uplink synchronization, the base station may transmit required information such as channel information, an uplink related parameter, and the like, together with a command instructing to start a necessary service. Terminals may appropriately use an uplink channel based on information that is received from the base station.

The terminal recognizing that the uplink synchronization is obtained by the base station transmits a data frame corresponding to a data signal to the base station (operation 240). Here, the terminal may transmit the data frame based on channel information or the uplink related parameter that is received from the base station in operation 230. Next, the receiver 110 receives the data frame (operation 250).

Figure 3B:
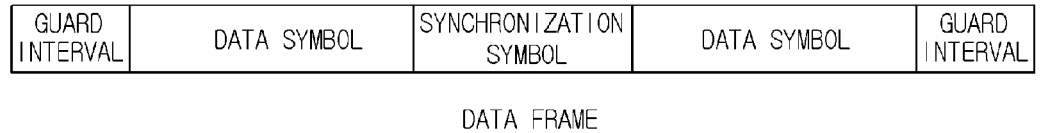

FIG. 3B shows an example of a data structure of a data frame. Similar to the initial access frame, the data frame includes a guard interval, a data symbol, and a synchronization symbol. The data symbol includes data that a terminal is to transmit to a base station. As shown in FIG. 3B, the synchronization symbol of the data frame is shorter than the synchronization symbol of the initial access frame. The synchronization symbol of the data frame is used to trace synchronization based on the obtained uplink synchronization and thus, only needs to have the minimum length enough to be capable of tracing synchronization.

Figure 4B:
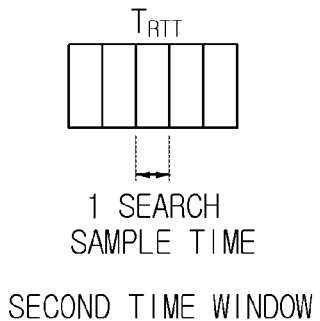

Referring again to FIG. 2, the synchronization tracer 140 traces the uplink synchronization using the synchronization symbol of the data frame based on the uplink synchronization that is obtained by the synchronization obtainment unit 120 (operation 260). Specifically, the synchronization tracer 140 performs correlation between a predefined code and the synchronization symbol in a time window having a predetermined size, and obtains time information of the uplink synchronization using a correlation value. FIG. 4B shows a time window for tracing synchronization. As shown in FIGS. 4A and 4B, the size of the time window for tracing the synchronization of FIG. 4B is significantly shorter than the time window for obtaining initial synchronization of FIG. 4A. The initial synchronization is already obtained and thus, if the time window for tracing the synchronization is about one or two samples to a few samples based on the obtained initial synchronization time, it will be enough. A time corresponding to the largest value among correlation values calculated in the time window is used as a new RTT of the corresponding terminal.

The synchronization tracer 140 updates time information of the uplink synchronization of the corresponding terminal, stored in the storage unit 150, with time information of the uplink synchronization obtained in operation 260. The updated uplink synchronization information is used as a reference to trace uplink synchronization using a synchronization symbol that is included in a subsequently received data frame.

When tracing of synchronization is completed, the synchronization tracer 140 transfers the received data frame and the uplink synchronization information to a demodulator (not shown) of the base station. The demodulator demodulates data from the data frame using the uplink synchronization information.

According to the aforementioned present invention, it is possible to efficiently use uplink wireless resources while stably obtaining uplink synchronization in a marine wireless communication system. Further, since uplink synchronization is maintained exclusively by a base station, not a terminal, a call procedure between the base station and the terminal is simplified.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An uplink synchronization method, comprising:
   transmitting, by a terminal, an initial access signal to a base station;
   obtaining, by the base station, an uplink synchronization using the initial access signal received from the terminal;
   informing, by the base station, the terminal about obtainment of the uplink synchronization;
   transmitting, by the terminal, a data signal to the base station; and
   receiving, by the base station, the data signal from the terminal,
   wherein the terminal transmits the initial access signal to the base station when a service request occurs in the terminal or the base station without transmitting a signal to the base station in advance by round trip time, and the base station receives the data signal using the uplink synchronization.

2. The method of claim 1, wherein:

an initial access frame corresponding to the initial access signal includes a first synchronization symbol, and the obtaining of the uplink synchronization obtains the uplink synchronization using the first synchronization symbol.

3. The method of claim 2, wherein:

a data frame corresponding to the data signal includes a second synchronization symbol, and the uplink synchronization method further comprises:

tracing, by the base station based on the obtained uplink synchronization, the uplink synchronization using the second synchronization symbol.

4. The method of claim 3, wherein a length of the first synchronization symbol is greater than a length of the second synchronization symbol.

5. The method of claim 3, further comprising:

demodulating, by the base station, data from the data frame using the traced uplink synchronization.

6. The method of claim 1, wherein:

an initial access frame corresponding to the initial access signal includes a first synchronization symbol, and the obtaining of the uplink synchronization obtains the uplink synchronization using correlation about the first synchronization symbol in a first time window.

7. The method of claim 6, wherein:

a data frame corresponding to the data signal includes a second synchronization symbol, and the uplink synchronization method further comprises:

tracing, by the base station based on the obtained uplink synchronization, the uplink synchronization using correlation about the second synchronization symbol in a second time window.

8. The method of claim 7, wherein the first time window is greater than the second time window.

9. The method of claim 1, further comprising:

matching, by the base station, time information of the obtained uplink synchronization and identification information of the terminal and storing the matched information.

10. The method of claim 1, wherein the terminal transmits the initial access signal to the base station every time a service request occurs in the terminal or the base station.

11. An uplink synchronization method of a base station, comprising:

receiving an initial access signal from a terminal;

obtaining an uplink synchronization using the received initial access signal;

informing the terminal about obtainment of the uplink synchronization; and receiving a data signal from the terminal, wherein the base station receives the initial access signal from the terminal when a service request occurs in the terminal or the base station without receiving a signal from the terminal in advance by round trip time, and the base station receives the data signal using the uplink synchronization.

12. The method of claim 11, wherein:

an initial access frame corresponding to the initial access signal includes a first synchronization symbol, and the obtaining of the uplink synchronization obtains the uplink synchronization using the first synchronization symbol.

13. The method of claim 12, wherein:

a data frame corresponding to the data signal includes a second synchronization symbol, and the uplink synchronization method further comprises:

tracing the uplink synchronization using the second synchronization symbol based on the obtained uplink synchronization.

14. The method of claim 13, wherein a length of the first synchronization symbol is greater than a length of the second synchronization symbol.

* * * * *